(12) United States Patent
Takahashi

(10) Patent No.: US 10,616,444 B2
(45) Date of Patent: Apr. 7, 2020

(54) ASIC AND IMAGE FORMING APPARATUS INCORPORATING SAME INCLUDING VARIABLE IMAGE PROCESSING

(71) Applicant: Ken Takahashi, Tokyo (JP)

(72) Inventor: Ken Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/161,315

(22) Filed: Oct. 16, 2018

(65) Prior Publication Data

US 2019/0208084 A1 Jul. 4, 2019

(30) Foreign Application Priority Data

Dec. 28, 2017 (JP) .................................. 2017-254678

(51) Int. Cl.
*H04N 1/41* (2006.01)
*H04N 1/327* (2006.01)
*H04N 1/32* (2006.01)

(52) U.S. Cl.
CPC ........... *H04N 1/41* (2013.01); *H04N 1/32005* (2013.01); *H04N 1/32037* (2013.01); *H04N 1/3275* (2013.01)

(58) Field of Classification Search
None
See application file for complete search history.

(56) References Cited

U.S. PATENT DOCUMENTS

| 2007/0030504 A1* | 2/2007 | Kawamoto | ............... | H04N 1/38 358/1.9 |
| 2016/0105582 A1* | 4/2016 | Nakajima | ............. | G06F 3/1238 358/1.15 |
| 2016/0277600 A1* | 9/2016 | Takahashi | .......... | H04N 1/00095 |

FOREIGN PATENT DOCUMENTS

| JP | 2000-307876 | 11/2000 |
| JP | 2004-237472 | 8/2004 |
| JP | 2004-282126 | 10/2004 |

\* cited by examiner

*Primary Examiner* — Andrew H Lam
(74) *Attorney, Agent, or Firm* — Harness, Dickey & Pierce, P.L.C.

(57) ABSTRACT

An ASIC includes: a communication circuit that communicates with a control circuit; a multi-level, fixed-length compression circuit that performs fixed-length compression on scanner-generated image data to output multi-level, fixed-length compressed image data; a tone processing circuit that performs tone processing on the scanner-generated image data to output reduced-level image data; a first selection circuit that selects one of the multi-level, fixed-length compressed image data and the reduced-level image data, as first selected image data to be transmitted by the communication circuit to the control circuit; a multi-level, fixed-length decompression circuit that performs fixed-length decompression on image data received by the communication circuit from the control circuit, to output fixed-length decompressed image data; and a second selection circuit that selects one of the fixed-length decompressed image data and the image data received by the communication circuit, as second selected image data to be output to the plotter.

20 Claims, 5 Drawing Sheets

ASIC AND IMAGE FORMING APPARATUS INCORPORATING SAME INCLUDING VARIABLE IMAGE PROCESSING

CROSS-REFERENCE TO RELATED APPLICATIONS

This patent application is based on and claims priority pursuant to 35 U.S.C. § 119(a) to Japanese Patent Application No. 2017-254678, filed on Dec. 28, 2017, in the Japan Patent Office, the entire disclosure of which is hereby incorporated by reference herein.

BACKGROUND

Technical Field

Embodiments of the present disclosure relates to an application specific integrated circuit (ASIC) and an image forming apparatus incorporating the ASIC.

Related Art

Various types of electrophotographic image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor as an image bearer. An optical writer irradiates the surface of the photoconductor thus charged with a light beam to form an electrostatic latent image on the surface of the photoconductor according to the image data. A developing device supplies toner to the electrostatic latent image thus formed to render the electrostatic latent image visible as a toner image. The toner image is then transferred onto a recording medium either directly, or indirectly via an intermediate transfer belt. Finally, a fixing device applies heat and pressure to the recording medium bearing the toner image to fix the toner image onto the recording medium. Thus, an image is formed on the recording medium.

Such image forming apparatuses often accumulate image data generated by a scanner in a storage medium, such as a memory or a hard disk drive (HDD), retrieve the image data from the storage medium, and transmit the image data to a plotter, thereby printing an image according to the image data. Relatedly, the image forming apparatuses may compress the image data and accumulate the compressed image data in the storage medium to reduce the usage of the storage medium.

SUMMARY

In one embodiment of the present disclosure, a novel application specific integrated circuit (ASIC) is connectable to a control circuit in an image forming apparatus including a scanner, a plotter, and the control circuit. The ASIC includes a communication circuit, a multi-level, fixed-length compression circuit, a tone processing circuit, a first selection circuit, a multi-level, fixed-length decompression circuit, and a second selection circuit.

The communication circuit communicates with the control circuit. The multi-level, fixed-length compression circuit performs fixed-length compression on image data generated by the scanner as multi-level image data to output multi-level, fixed-length compressed image data. The tone processing circuit performs tone processing on the image data generated by the scanner to reduce the image data and output reduced-level image data. The first selection circuit selects one of the multi-level, fixed-length compressed image data and the reduced-level image data, as first selected image data to be transmitted by the communication circuit to the control circuit. The multi-level, fixed-length decompression circuit performs fixed-length decompression on image data received by the communication circuit from the control circuit, to output fixed-length decompressed image data. The second selection circuit selects one of the fixed-length decompressed image data and the image data received by the communication circuit, as second selected image data to be output to the plotter.

Also described is a novel image forming apparatus incorporating the ASIC.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
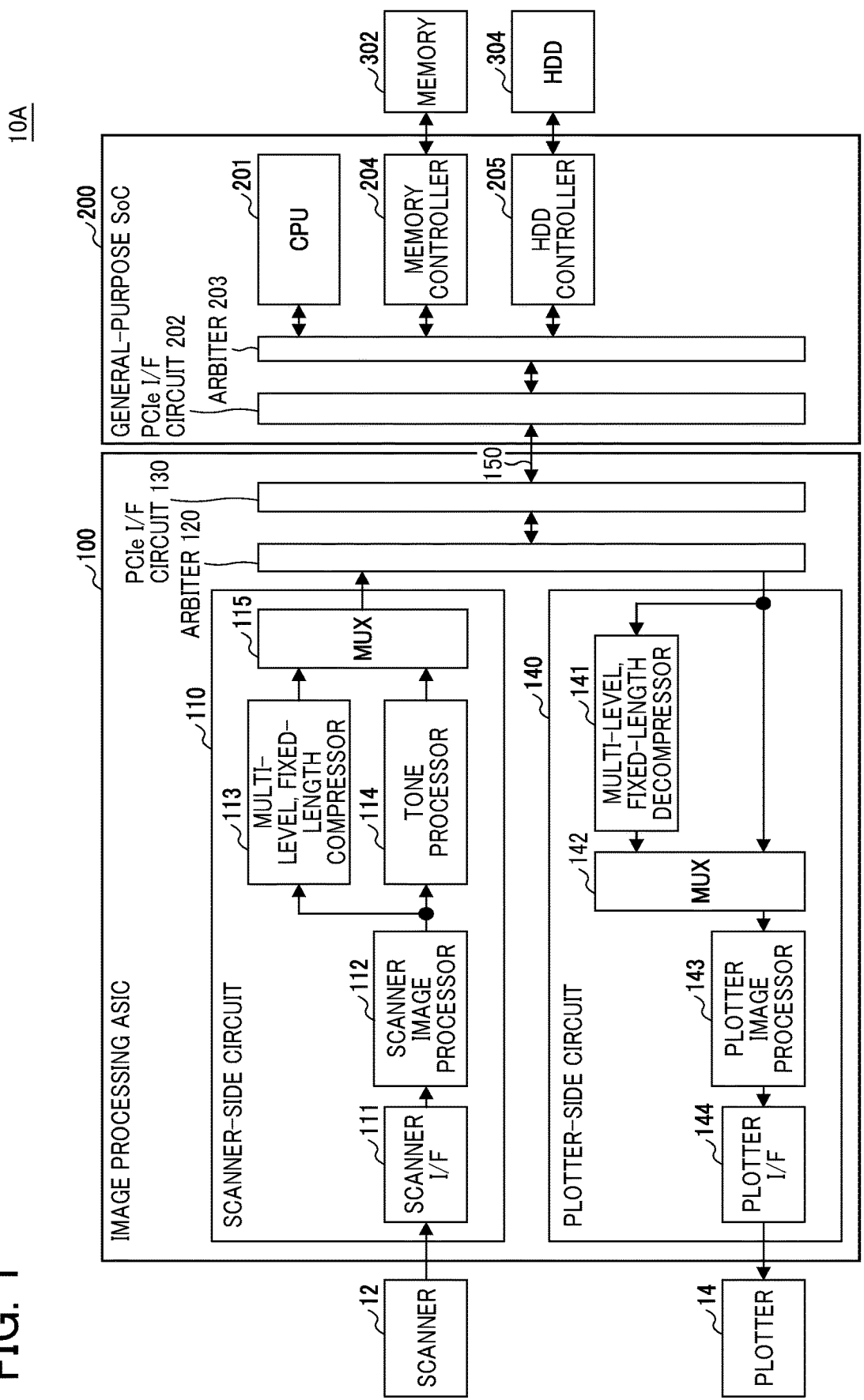
FIG. 1 is a block diagram illustrating a hardware configuration of an image forming apparatus according to a first embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring to the drawings, wherein like reference numerals designate identical or corresponding parts throughout the several views, embodiments of the present disclosure are described below.

First Embodiment

Initially, a description is given of a first embodiment of the present disclosure.

Specifically, a description is now given of a multifunctional image forming apparatus 10A. The multifunctional image forming apparatus 10A includes, e.g., an image processing application specific integrated circuit (ASIC) 100 and a general-purpose system on a chip (SoC) 200.

<Hardware Configuration of Image Forming Apparatus 10A>

Referring now to FIG. 1, a description is given of a hardware configuration of the image forming apparatus 10A according to the first embodiment of the present disclosure.

FIG. 1 is a block diagram illustrating the hardware configuration of the image forming apparatus 10A.

As illustrated in FIG. 1, the image forming apparatus 10A includes a scanner 12, a plotter 14, a memory 302, and a hard disk drive (HDD) 304, in addition to the image processing ASIC 100 and the general-purpose SoC 200 described above.

The scanner 12 optically reads a read medium (e.g., manuscript paper), thereby forming an image of the read medium and generating image data representing the image.

The plotter 14 prints the image on a recording medium (e.g., sheet) according to the image data.

The image processing ASIC 100 is an example of "ASIC". The image processing ASIC 100 is a dedicated integrated circuit (IC) for performing various kinds of image processing on the image data generated by the scanner 12. The image processing ASIC 100 includes a scanner-side circuit 110, an arbiter 120, a peripheral component interconnect express (PCIe) interface (I/F) circuit 130, and a plotter-side circuit 140.

The scanner-side circuit 110 performs various kinds of processing on the image data input from the scanner 12. The scanner-side circuit 110 includes a scanner I/F 111, a scanner image processor 112, a multi-level, fixed-length compressor 113, a tone processor 114, and a multiplexer (MUX) 115.

The scanner I/F 111 receives the image data generated by the scanner 12.

The scanner image processor 112 performs image processing specific to the scanner 12 (hereinafter referred to as scanner-specific image processing) on the image data received by the scanner I/F 111. Examples of the scanner-specific image processing include shading correction, flat-fielding, gamma (γ) conversion, spatial filtering, and color correction.

The multi-level, fixed-length compressor 113 is an example of a "multi-level, fixed-length compression circuit". The multi-level, fixed-length compressor 113 performs fixed-length compression on the image data, as multi-level image data, subjected to the scanner-specific image processing by the scanner image processor 112. Thus, the multi-level, fixed-length compressor 113 outputs multi-level, fixed-length compressed image data.

The tone processor 114 is an example of a "tone processing circuit". The tone processor 114 performs tone processing on the image data subjected to the scanner-specific image processing by the scanner image processor 112 to reduce the image data. Thus, the tone processor 114 outputs reduced-level image data.

The MUX 115 is an example of a "first selection circuit". The MUX 115 selects one of the image data (i.e., fixed-length compressed image data) output from the multi-level, fixed-length compressor 113 and the image data (i.e., reduced-level image data) output from the tone processor 114, as first selected image data to be transmitted to the general-purpose SoC 200. The MUX 115 is set to select one of the image data (i.e., fixed-length compressed image data) output from the multi-level, fixed-length compressor 113 and the image data (i.e., reduced-level image data) output from the tone processor 114, according to the capacity of an accumulator that accumulates image data (e.g., first selected image data), for example. Specifically, the MUX 115 is settable so as to select the image data output from the multi-level, fixed-length compressor 113 in a case in which the accumulator has a relatively large capacity. By contrast, the MUX 115 is settable so as to select the image data output from the tone processor 114 in a case in which the accumulator has a relatively small capacity. In the first embodiment, in response to connection of the general-purpose SoC 200 to the image processing ASIC 100, the setting of the MUX 115 is switchable so as to select the image data (i.e., fixed-length compressed image data) output from the multi-level, fixed-length compressor 113 as image data to be transmitted to the general-purpose SoC 200.

The arbiter 120 is an example of an "arbitration circuit". The arbiter 120 arbitrates image data transfer between the image processing ASIC 100 and the general-purpose SoC 200. For example, the arbiter 120 arbitrates image data transfer between the image processing ASIC 100 and the general-purpose SoC 200 so as to give priority to one of a send request from the scanner-side circuit 110 and a receive request from the plotter-side circuit 140. The send request requests to send the first selected image data selected by the MUX 115 to the SoC 200. The receive request requests to receive image data transmitted from the SoC 200.

The PCIe I/F circuit 130 is an example of a "communication circuit" or "first communication circuit". The PCIe I/F circuit 130 is communicably connected to the general-purpose SoC 200 via a PCIe bus serving as a transmission line. For example, the PCIe I/F circuit 130 transmits the image data (i.e., fixed-length compressed image data or reduced-level image data) selected by the MUX 115 to the general-purpose SoC 200. On the other hand, for example, the PCIe I/F circuit 130 receives image data (i.e., fixed-length compressed image data or reduced-level image data) transmitted from the general-purpose SoC 200.

The plotter-side circuit 140 performs various kinds of processing on image data to be output to the plotter 14. The plotter-side circuit 140 includes a multi-level, fixed-length decompressor 141, an MUX 142, a plotter image processor 143, and a plotter I/F 144.

The multi-level, fixed-length decompressor 141 is an example of a "multi-level, fixed-length decompression circuit". The multi-level, fixed-length decompressor 141 performs fixed-length decompression on image data (in this case, fixed-length compressed image data) received by the PCIe I/F circuit 130 from the general-purpose SoC 200. Thus, the multi-level, fixed-length decompressor 141 outputs fixed-length decompressed image data.

The MUX 142 is an example of a "second selection circuit". The MUX 142 selects one of the image data (i.e., fixed-length decompressed image data) output from the multi-level, fixed-length decompressor 141 and the image data (in this case, reduced-level image data) received from the general-purpose SoC 200, as second selected image data to be output to the plotter 14. The MUX 142 is set to select one of the image data (i.e., fixed-length decompressed image data) output from the multi-level, fixed-length decompressor 141 and the image data received from the general-purpose SoC 200, according to the capacity of the accumulator that accumulates image data (e.g., first selected image data), for example. Specifically, the MUX 142 is settable so as to select the image data output from the multi-level, fixed-length decompressor 141 in a case in which the accumulator has a relatively large capacity. By contrast, the MUX 142 is settable so as to select the image data received from the general-purpose SoC 200 in a case in which the accumulator has a relatively small capacity. In the first embodiment, in response to connection of the general-purpose SoC 200 to the image processing ASIC 100, the setting of the MUX 142 is switchable so as to select the image data (i.e., fixed-length decompressed image data) output from the multi-level, fixed-length decompressor 141 as image data to be transmitted to the plotter 14.

The plotter image processor 143 performs image processing specific to the plotter 14 (hereinafter referred to as plotter-specific image processing) on the image data (i.e., fixed-length decompressed image data or reduced-level image data) selected by the MUX 142. Examples of the plotter-specific image processing include γ conversion and tone processing.

The plotter I/F 144 transmits, to the plotter 14, the image data subjected to the plotter-specific image processing by the plotter image processor 143.

The general-purpose SoC 200 is an example of a "control circuit". The general-purpose SoC 200 includes a central processing unit (CPU) 201, a PCIe I/F circuit 202, an arbiter 203, a memory controller 204, and an HDD controller 205.

The CPU 201 executes various kinds of processing in the general-purpose SoC 200. For example, in response to a user instruction, the CPU 201 performs image processing such as rotation on the image data (i.e., fixed-length compressed image data) accumulated in the HDD 304.

The PCIe I/F circuit 202 is an example of a "control-circuit-side communication circuit" or "second communication circuit". The PCIe I/F circuit 202 communicably connected to the image processing ASIC 100 via the PCIe bus. For example, the PCIe I/F circuit 202 transmits the image data (i.e., fixed-length compressed image data) accumulated in the HDD 304 to the image processing ASIC 100. On the other hand, for example, the PCIe I/F circuit 202 receives the image data (i.e., fixed-length compressed image data) transmitted from the image processing ASIC 100.

The arbiter 203 arbitrates image data transfer between the image processing ASIC 100 and the general-purpose SoC 200.

The memory controller 204 controls writing and reading of various kinds of data in and from the memory 302. For example, the memory controller 204 temporarily stores, in the memory 302, the image data (i.e., fixed-length compressed image data) received from the image processing ASIC 100.

The HDD controller 205 controls writing and reading of various kinds of data in and from the HDD 304. The HDD controller 205 is an example of an "accumulation control circuit". That is, the HDD controller 205 is capable of controlling writing and reading of image data (i.e., fixed-length compressed image data) in and from the HDD 304.

The memory 302 and the HDD 304 store various kinds of data in the general-purpose SoC 200. For example, the memory 302 temporarily stores the image data (i.e., fixed-length compressed image data) received from the image processing ASIC 100. The HDD 304 is an example of an "accumulator". That is, the HDD 304 is capable of accumulating the image data (i.e., fixed-length compressed image data).

With such a configuration, the image forming apparatus 10A of the first embodiment is capable of performing image processing such as rotation on the image data (i.e., fixed-length compressed image data) accumulated in the HDD 304, in response to a user instruction, for example.

According to the first embodiment, the image forming apparatus 10A is implemented as a multifunctional image forming apparatus, with a combination of the image processing ASIC 100 and the general-purpose SoC 200.

<Operation Procedure of Image Forming Apparatus 10A>

Figure 2:
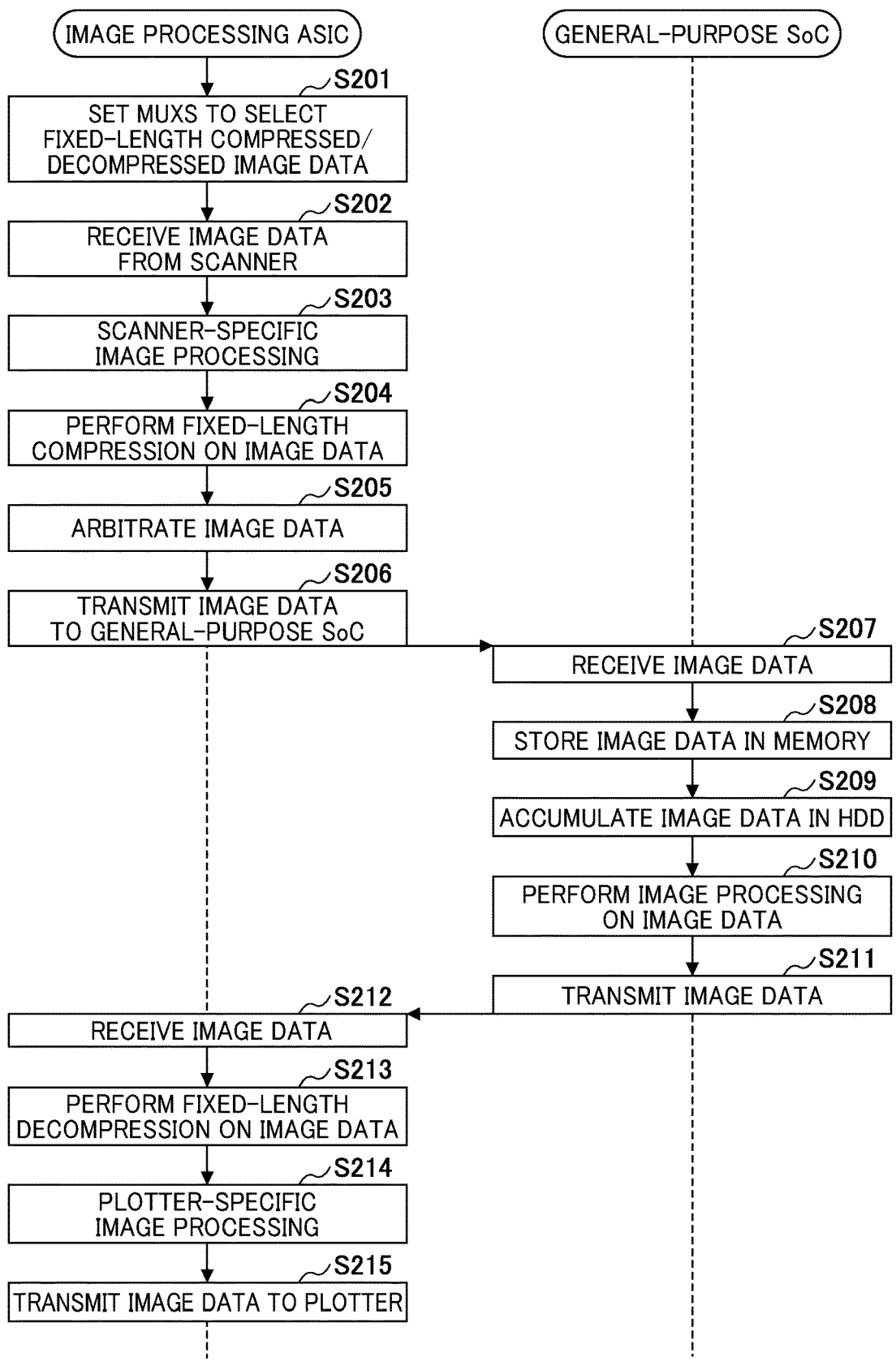
FIG. 2 is a sequence diagram illustrating an operation procedure of the image forming apparatus according to the first embodiment of the present disclosure.

Referring now to FIG. 2, a description is given of an operation procedure of the image forming apparatus 10A according to the first embodiment of the present disclosure.

FIG. 2 is a sequence diagram illustrating an operation procedure of the image forming apparatus 10A.

In the image processing ASIC 100, in step S201, the MUX 115 and the MUX 142 are set to select fixed-length compressed image data and fixed-length decompressed image data, respectively. Specifically, the setting of the MUX 115 is switched so as to select image data (i.e., fixed-length compressed image data) output from the multi-level, fixed-length compressor 113. The setting of the MUX 142 is switched so as to select image data (i.e., fixed-length decompressed image data) output from the multi-level, fixed-length decompressor 141.

In step S202, the scanner I/F 111 receives image data from the scanner 12.

In step S203, the scanner image processor 112 performs scanner-specific image processing on the image data received in step S202.

In step S204, the multi-level, fixed-length compressor 113 performs fixed-length compression on the image data, as multi-level data, subjected to the scanner-specific image processing in step S203. The multi-level, fixed-length compressor 113 then transmits the image data subjected to the fixed-length compression, that is, multi-level, fixed-length compressed image data to the arbiter 120 via the MUX 115.

In step S205, the arbiter 120 receives and arbitrates the image data.

In step S206, the arbiter 120 transmits the image data thus arbitrated to the general-purpose SoC 200 via the PCIe I/F circuit 130.

In the general-purpose SoC 200, in step S207, the PCIe I/F circuit 202 receives the image data (i.e., fixed-length compressed image data) transmitted from the image processing ASIC 100.

In step S208, the memory controller 204 temporarily stores, in the memory 302, the image data received in step S207.

In step S209, the HDD controller 205 accumulates, in the HDD 304, the image data stored in the memory 302.

In step S210, in response to a user instruction, the CPU 201 performs image processing such as rotation on the image data (i.e., fixed-length compressed image data) accumulated in the HDD 304.

In step S211, the arbiter 203 transmits the image data to the image processing ASIC 100 via the PCIe I/F circuit 202.

In the image processing ASIC 100, in step S212, the PCIe I/F circuit 130 receives the image data (i.e., fixed-length compressed image data) transmitted from the general-purpose SoC 200.

In step S213, the multi-level, fixed-length decompressor 141 performs fixed-length decompression on the image data (i.e., fixed-length compressed image data) received in step S212. The multi-level, fixed-length decompressor 141 then transmits the fixed-length decompressed image data to the plotter image processor 143 via the MUX 142.

In step S214, the plotter image processor 143 receives the image data and performs plotter-specific image processing on the image data.

In step S215, the plotter I/F 144 transmits, to the plotter 14, the image data subjected to the plotter-specific image processing in step S214.

According to the image data received, the plotter 14 prints an image.

Second Embodiment

Now, a description is given of a second embodiment of the present disclosure.

Specifically, a description is now given of a low-cost image forming apparatus 10B. The image forming apparatus 10B includes, e.g., the image processing ASIC 100 described above and a general-purpose SoC 250.

<Hardware Configuration of Image Forming Apparatus 10B>

Figure 3:
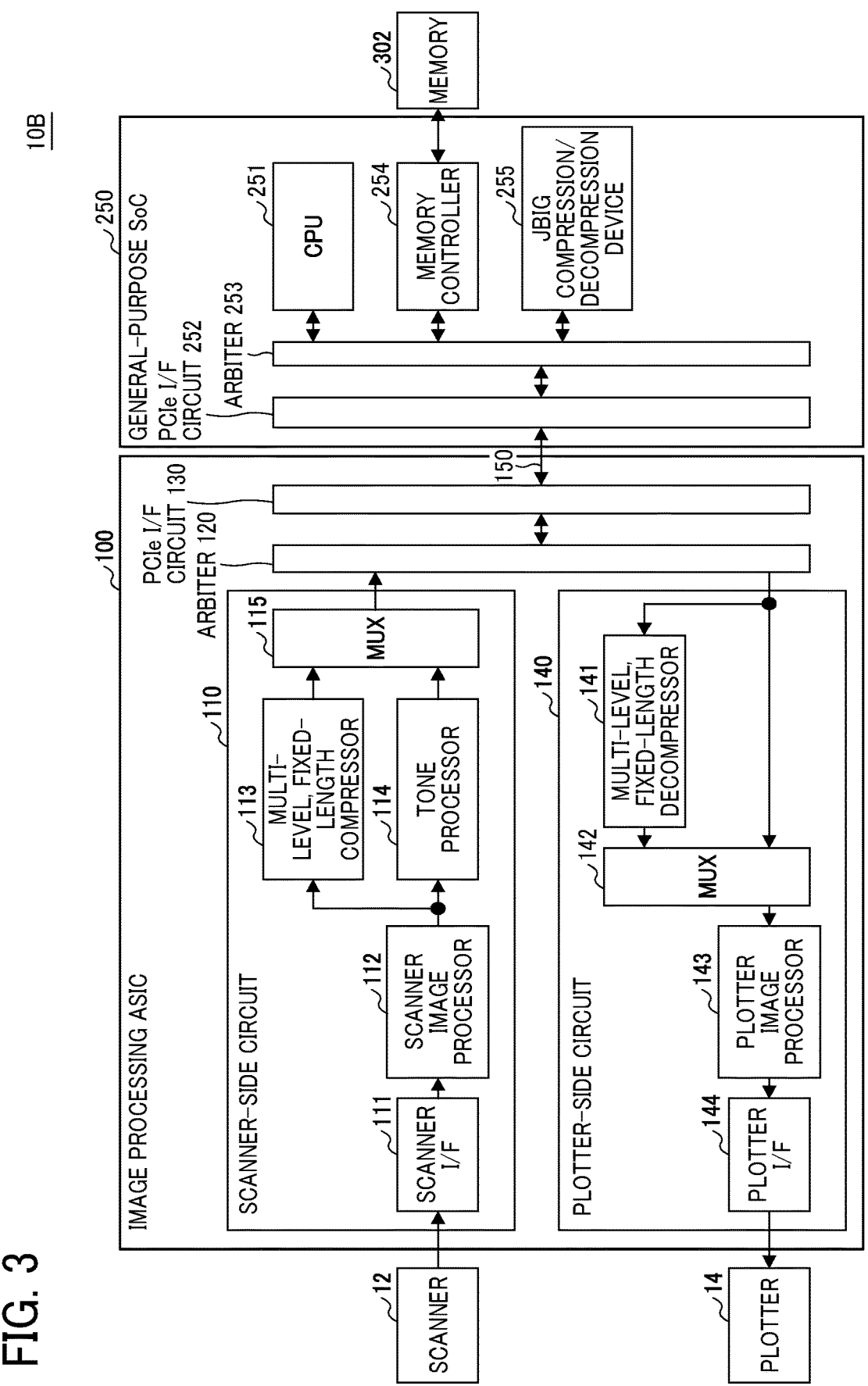
FIG. 3 is a block diagram illustrating a hardware configuration of an image forming apparatus according to a second embodiment of the present disclosure.

Referring now to FIG. 3, a description is given of a hardware configuration of the image forming apparatus 10B according to the second embodiment of the present disclosure.

FIG. 3 is a block diagram illustrating the hardware configuration of the image forming apparatus 10B.

As illustrated in FIG. 3, the image forming apparatus 10B of the second embodiment is different from the image forming apparatus 10A of the first embodiment in that the image forming apparatus 10B includes the general-purpose SoC 250 instead of the general-purpose SoC 200 and that the image forming apparatus 10B excludes the HDD 304.

The general-purpose SoC 250 is an example of a "control circuit". The general-purpose SoC 250 includes a CPU 251, a PCIe I/F circuit 252, an arbiter 253, a memory controller 254, and a Joint Bi-level Image Experts Group (JBIG) compression/decompression device 255.

The CPU 251 executes various kinds of processing in the general-purpose SoC 250.

The PCIe I/F circuit 252 is an example of a "control-circuit-side communication circuit" or "second communication circuit". The PCIe I/F circuit 252 communicates with the image processing ASIC 100. For example, the PCIe I/F circuit 252 transmits image data (i.e., reduced-level image data) accumulated in the memory 302 to the image processing ASIC 100. On the other hand, for example, the PCIe I/F circuit 252 receives image data (i.e., reduced-level image data) transmitted from the image processing ASIC 100.

The arbiter 253 arbitrates image data transfer between the image processing ASIC 100 and the general-purpose SoC 250.

The memory controller 254 controls writing and reading of various kinds of data in and from the memory 302. The memory controller 254 is an example of a "accumulation control circuit". That is, the memory controller 254 is capable of controlling writing and reading of image data (i.e., reduced-level image data) in and from the memory 302.

The JBIG compression/decompression device 255 is an example of a "reduced-level compression circuit" and a "reduced-level decompression circuit". The JBIG compression/decompression device 255 employs a JBIG coding method to perform compression and decompression on the image data (i.e., reduced-level image data) accumulated in the memory 302.

In the second embodiment, the memory 302 serves as an "accumulator". That is, the memory 302 is capable of accumulating image data (i.e., reduced-level image data).

In the second embodiment, in response to connection of the general-purpose SoC 250 to the image processing ASIC 100, the setting of the MUX 115 is switchable so as to select image data (i.e., reduced-level image data) output from the tone processor 114 as image data to be transmitted to the general-purpose SoC 250.

Similarly, in the second embodiment, in response to connection of the general-purpose SoC 250 to the image processing ASIC 100, the setting of the MUX 142 is switchable so as to select image data (i.e., reduced-level image data) received from the general-purpose SoC 250 as image data to be transmitted to the plotter 14.

As described above, according to the first embodiment, the image forming apparatus 10A performs image processing such as rotation on the image data accumulated in an accumulator (e.g., HDD 304). By contrast, according to the second embodiment, the image forming apparatus 10B configured as described above includes an accumulator (e.g., memory 302) having a relatively small capacity to accumulate reduced-level image data. That is, according to the second embodiment, the image forming apparatus 10B is implemented as a relatively low-cost image forming apparatus, with a combination of the image processing ASIC 100 and the general-purpose SoC 250.

<Operation Procedure of Image Forming Apparatus 10B>

Figure 4:
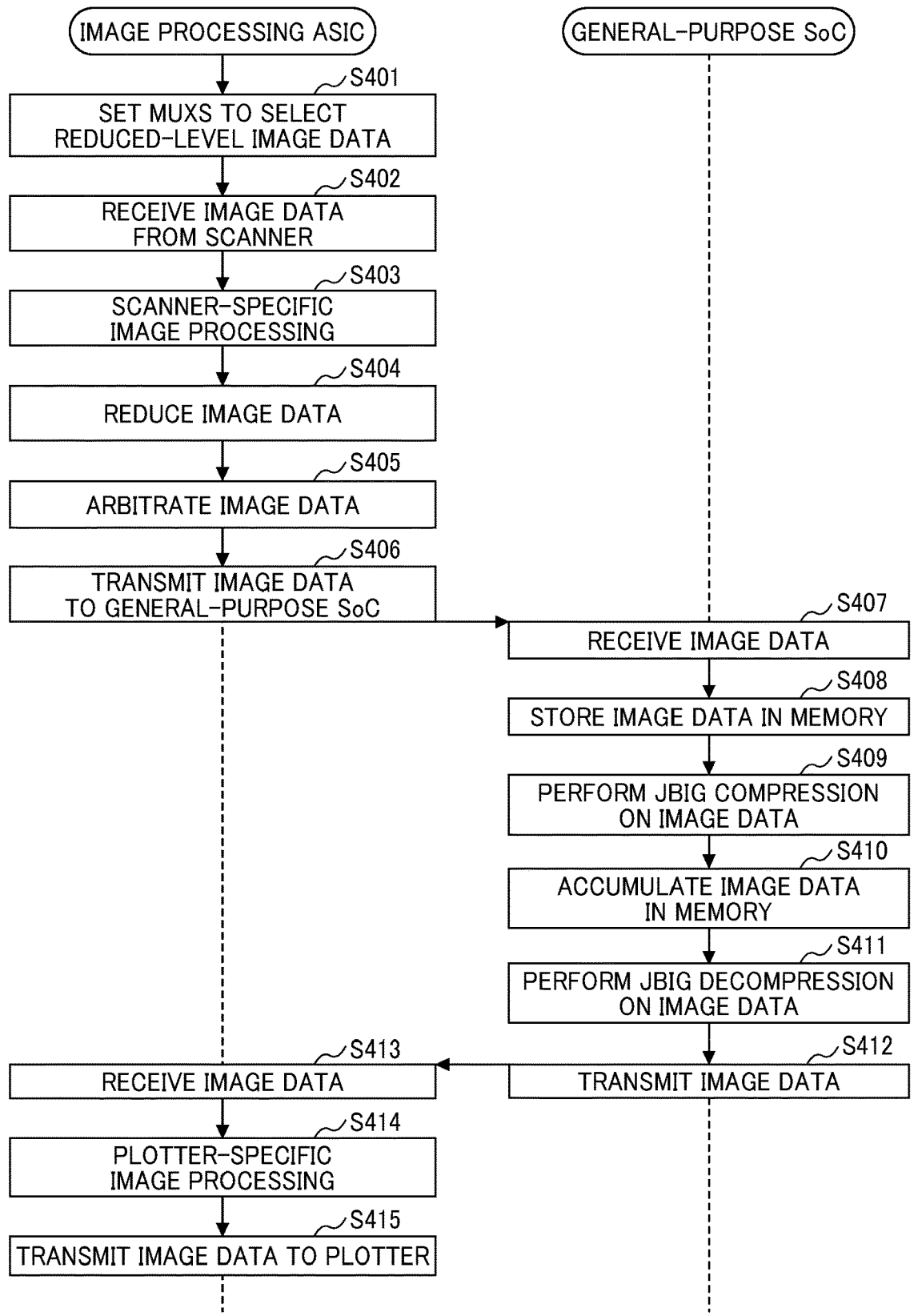
FIG. 4 is a sequence diagram illustrating an operation procedure of the image forming apparatus according to the second embodiment of the present disclosure.

Referring now to FIG. 4, a description is given of an operation procedure of the image forming apparatus 10B according to the second embodiment of the present disclosure.

FIG. 4 is a sequence diagram illustrating an operation procedure of the image forming apparatus 10B.

In the image processing ASIC 100, in step S401, the MUX 115 and the MUX 142 are set to select reduced-level image data. Specifically, the setting of the MUX 115 is switched so as to select image data (i.e., reduced-level image data) output from the tone processor 114. The setting of the MUX 142 is switched so as to select image data (i.e., reduced-level image data) received from the general-purpose SoC 250.

In step S402, the scanner I/F 111 receives image data from the scanner 12.

In step S403, the scanner image processor 112 performs scanner-specific image processing on the image data received in step S402.

In step S404, the tone processor 114 performs tone processing on the image data subjected to the scanner-specific image processing by the scanner image processor 112, thereby reducing the image data. The tone processor 114 then transmits the image data subjected to the tone processing, that is, reduced-level image data to the arbiter 120 via the MUX 115.

In step S405, the arbiter 120 receives and arbitrates the image data.

In step S406, the arbiter 120 transmits the image data thus arbitrated to the general-purpose SoC 250 via the PCIe I/F circuit 130.

In the general-purpose SoC 250, in step S407, the PCIe I/F circuit 252 receives the image data (i.e., reduced-level image data) transmitted from the image processing ASIC 100.

In step S408, the memory controller 254 temporarily stores, in the memory 302, the image data received in step S407.

In step S409, the JBIG compression/decompression device 255 performs compression by the JBIG coding method (i.e., JBIG compression) on the image data (i.e., reduced-level image data) stored in the memory 302. Thus, the JBIG compression/decompression device 255 generates reduced-level compressed image data.

In step S410, the memory controller 254 accumulates, in the memory 302, the image data compressed in step S409, that is, the reduced-level compressed image data.

In step S411, in response to a user instruction, the JBIG compression/decompression device 255 performs decompression by the JBIG coding method (i.e., JBIG decompression) on the image data (i.e., reduced-level compressed image data) accumulated in the memory 302. Thus, the JBIG compression/decompression device 255 generates reduced-level decompressed image data.

In step S412, the arbiter 253 transmits the image data (i.e., reduced-level decompressed image data) to the image processing ASIC 100 via the PCIe I/F circuit 252.

In the image processing ASIC 100, in step S413, the PCIe I/F circuit 130 receives the image data (i.e., reduced-level image data) transmitted from the general-purpose SoC 250. The image data is transmitted to the plotter image processor 143 via, e.g., the MUX 142.

In step S414, the plotter image processor 143 receives the image data and performs plotter-specific image processing on the image data.

In step S415, the plotter I/F 144 transmits, to the plotter 14, the image data subjected to the plotter-specific image processing in step S414.

According to the image data received, the plotter 14 prints an image.

<Example of Arbitration Performed by Arbiter 120>

Figure 5:
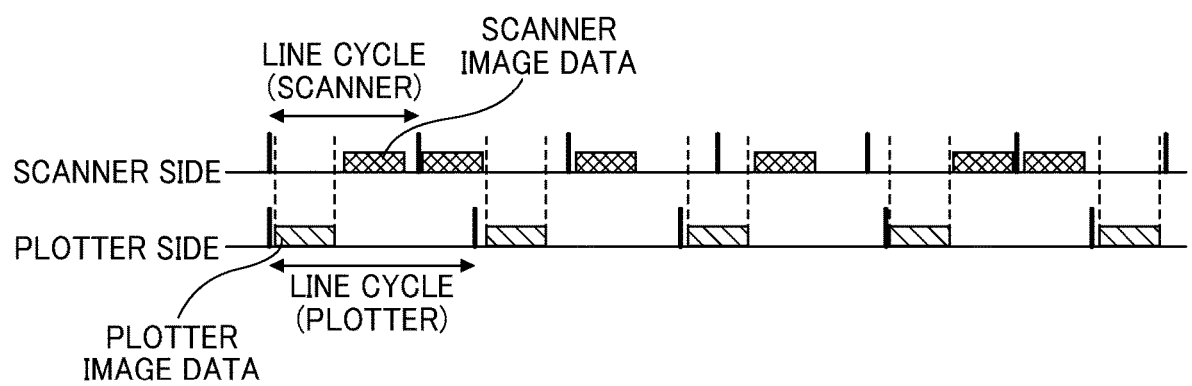
FIG. 5 is a diagram illustrating an example of arbitration performed by an arbiter according to the first and second embodiments of the present disclosure.

Referring now to FIG. 5, a description is given of an example of arbitration performed by the arbiter 120 according to the first and second embodiments of the present disclosure.

FIG. 5 is a diagram illustrating an example of arbitration performed by the arbiter 120.

Some general-purpose SoCs incorporated in image forming apparatuses are provided with a single I/F. In image forming apparatuses, scanners and plotters transfer given image data within a certain period, depending on performance (e.g., linear speed) thereof. For example, in an image forming apparatus that performs image processing for each line, image data for one line is transferred within a period called a line cycle. If image data transfer is not made within the certain period, unfavorable situations may arise, such as an image data collapse and an output of a blank sheet.

To address such unfavorable situations, the image processing ASIC 100 includes the arbiter 120 that arbitrates image data transfer as illustrated in FIG. 5. Specifically, according to the first embodiment, the arbiter 120 arbitrates image transfer between the image processing ASIC 100 and the general-purpose SoC 200. According to the second embodiment, the arbiter 120 arbitrates image transfer between the image processing ASIC 100 and the general-purpose SoC 250. Specifically, in the image processing ASIC 100 of the first and second embodiments, the arbiter 120 arbitrates image data transfer so as to normally give priority to a read request from the plotter-side circuit 140 and to permit a write request from the scanner-side circuit 110 only when the arbiter 120 receives no read request from the plotter-side circuit 140. Accordingly, the image processing ASIC 100 of the first and second embodiments is connectable to a general-purpose SoC having a single I/F without causing the unfavorable situations described above. Alternatively, for example, in the image processing ASIC 100 of the first and second embodiments, the arbiter 120 may arbitrate image data transfer so as to normally give priority to a write request from the scanner-side circuit 110 and to permit a read request from the plotter-side circuit 140 only when the arbiter 120 receives no write request from the scanner-side circuit 110.

As described above, according to the first and second embodiments, the image processing ASIC 100 includes the MUX 115 and the MUX 142. According to the first embodiment, the MUX 115 selects one of the image data output from the multi-level, fixed-length compressor 113 and the image data output from the tone processor 114 as first selected image data to be transmitted to the general-purpose SoC 200 via the PCIe I/F circuit 130. The MUX 142 selects one of the image data output from the multi-level, fixed-length decompressor 141 and the image data received from the general-purpose SoC 200 via the PCIe I/F circuit 130 as second selected image data to be transmitted to the plotter 14. According to the second embodiment, the MUX 115 selects one of the image data output from the multi-level, fixed-length compressor 113 and the image data output from the tone processor 114 as first selected image data to be transmitted to the general-purpose SoC 250 via the PCIe I/F circuit 130. The MUX 142 selects one of the image data output from the multi-level, fixed-length decompressor 141 and the image data received from the general-purpose SoC 250 via the PCIe I/F circuit 130 as second selected image data to be transmitted to the plotter 14.

With such a configuration, according to the first embodiment, the image forming apparatus 10A is implemented as a multifunctional image forming apparatus capable of performing fixed-length compression, with a combination of the image processing ASIC 100 and the general-purpose SoC 200. According to the second embodiment, the image forming apparatus 10B is implemented as a relatively low-cost image forming apparatus capable of performing tone processing, with a combination of the image processing ASIC 100 and the general-purpose SoC 250.

Conventionally, a multifunctional image forming apparatus is configured with a dedicated image processing ASIC for performing fixed-length compression; whereas a low-cost image forming apparatus is configured with a dedicated image processing ASIC for performing tone processing.

By contrast, according to the embodiments described above, both a multifunctional image forming apparatus capable of performing fixed-length compression and a low-cost image forming apparatus capable of performing tone processing are attained with a single ASIC, namely, the image processing ASIC 100.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, any of the above-described devices or units can be implemented as a hardware apparatus, such as a special-purpose circuit or device, or as a hardware/software combination, such as a processor executing a software program.

What is claimed is:

1. An application specific integrated circuit (ASIC) connectable to a control circuit in an image forming apparatus including a scanner, a plotter, and the control circuit, the ASIC comprising:
    a communication circuit configured to communicate with the control circuit;
    a multi-level, fixed-length compression circuit configured to perform fixed-length compression on image data generated by the scanner as multi-level image data, to output multi-level, fixed-length compressed image data;
    a tone processing circuit configured to perform tone processing on the image data generated by the scanner to reduce the image data and output reduced-level image data;
    a first selection circuit configured to select one of the multi-level, fixed-length compressed image data and the reduced-level image data, as first selected image data to be transmitted by the communication circuit to the control circuit;
    a multi-level, fixed-length decompression circuit configured to perform fixed-length decompression on image data received by the communication circuit from the control circuit, to output fixed-length decompressed image data; and
    a second selection circuit configured to select one of the fixed-length decompressed image data and the image data received by the communication circuit, as second selected image data to be output to the plotter.

2. The ASIC according to claim 1, further comprising an arbitration circuit, the arbitration circuit configured to arbitrate image data transfer between the ASIC and the control circuit.

3. The ASIC according to claim 2,
    wherein the arbitration circuit is configured to gives priority to one of a send request that requests to send the first selected image data to the control circuit and a receive request that requests to receive image data transmitted from the control circuit.

4. The ASIC according to claim 1,
    wherein the first selection circuit is configured to set to select one of the multi-level, fixed-length compressed image data and the reduced-level image data, according to a capacity of an accumulator that accumulates the first selected image data, and
    wherein the second selection circuit is configured to set to select one of the fixed-length decompressed image data and the image data received by the communication circuit, according to the capacity of the accumulator.

5. The ASIC according to claim 1,
    wherein the communication circuit is connectable to the control circuit via a single transmission line.

6. An image forming apparatus comprising:
    a scanner;
    a plotter;
    a control circuit; and
    the ASIC according to claim 1.

7. The image forming apparatus according to claim 6, further comprising an accumulator, wherein
    the control circuit includes,
        a control-circuit-side communication circuit configured to communicate with the ASIC;
        a reduced-level compression circuit configured to compress image data received from the ASIC to generate reduced-level compressed image data;
        an accumulation control circuit configured to accumulate the reduced-level compressed image data in the accumulator; and
        a reduced-level decompression circuit configured to decompress the reduced-level compressed image data accumulated in the accumulator to generate reduced-level decompressed image data, and
    wherein the control-circuit-side communication circuit is configured to transmit the reduced-level decompressed image data to the ASIC.

8. The image forming apparatus according to claim 7,
    wherein the reduced-level compression circuit and the reduced-level decompression circuit are configured to employ a Joint Bi-level Image Experts Group (JBIG) coding method to compress the image data received and decompress the reduced-level compressed image data, respectively.

9. The image forming apparatus according to claim 8, further comprising a single transmission line, the single transmission line configured to connect the communication circuit of the ASIC to the control-circuit-side communication circuit of the control circuit.

10. An application specific integrated circuit (ASIC) connectable to a control circuit in an image forming apparatus including a scanner, a plotter, and the control circuit, the ASIC comprising:
    means for communicating with the control circuit;
    means for performing fixed-length compression on image data generated by the scanner as multi-level image data, to output multi-level, fixed-length compressed image data;
    means for performing tone processing on the image data generated by the scanner to reduce the image data and output reduced-level image data;
    first means for selecting one of the multi-level, fixed-length compressed image data and the reduced-level image data, as first selected image data to be transmitted by the means for communicating to the control circuit;
    means for performing fixed-length decompression on image data received by the means for communicating from the control circuit, to output fixed-length decompressed image data; and
    second means for selecting one of the fixed-length decompressed image data and the image data received by the means for communicating, as second selected image data to be output to the plotter.

11. The ASIC according to claim 10, further comprising means for arbitrating image data transfer between the ASIC and the control circuit.

12. The ASIC according to claim 11,
wherein the means for arbitrating gives priority to one of a send request that requests to send the first selected image data to the control circuit and a receive request that requests to receive image data transmitted from the control circuit.

13. The ASIC according to claim 10,
wherein the first means for selecting is set to select one of the multi-level, fixed-length compressed image data and the reduced-level image data, according to a capacity of an accumulator that accumulates the first selected image data, and
wherein the second means for selecting is set to select one of the fixed-length decompressed image data and the image data received by the means for communicating, according to the capacity of the accumulator.

14. The ASIC according to claim 10,
wherein the means for communicating is connectable to the control circuit via a single transmission line.

15. An image forming apparatus comprising:
a scanner;
a plotter;
a control circuit; and
the ASIC according to claim 10.

16. The image forming apparatus according to claim 15, further comprising an accumulator, wherein
the control circuit includes:
control-circuit-side means for communicating with the ASIC;
means for compressing image data received from the ASIC to generate reduced-level compressed image data;
means for accumulating the reduced-level compressed image data in the accumulator; and
means for decompressing the reduced-level compressed image data accumulated in the accumulator to generate reduced-level decompressed image data, and
wherein the control-circuit-side means for communicating transmitting the reduced-level decompressed image data to the ASIC.

17. The image forming apparatus according to claim 16,
wherein the means for compressing and the means for decompressing employ a Joint Bi-level Image Experts Group (JBIG) coding method to compress the image data received and decompress the reduced-level compressed image data, respectively.

18. The image forming apparatus according to claim 16, further comprising a single transmission line, the single transmission line configured to connect the means for communicating of the ASIC to the control-circuit-side means for communicating of the control circuit.

19. A device comprising:
processing circuitry configured to,
perform fixed-length compression on first image data received from an apparatus to generate compressed first image data;
perform tone processing on the first image data to generate reduced-level first image data;
multiplex between the compressed first image data and the reduced-level first image data, based on a first selection input, to select first multiplexed image data;
perform fixed-length decompression on second image data received from the apparatus to generate uncompressed second image data;
multiplex between the second image data and the uncompressed second image data, based on a second selection input, to select second multiplexed image data; and
send the first multiplexed image data and the second multiplexed image data to the apparatus.

20. The device according to claim 19,
wherein the apparatus includes an accumulator, and
wherein the first selection input and the second selection input are based on a capacity of the accumulator.

\* \* \* \* \*